(12) United States Patent
Sarafianos et al.

(10) Patent No.: US 11,049,419 B2
(45) Date of Patent: Jun. 29, 2021

(54) METHOD FOR RANDOMLY MODIFYING THE CONSUMPTION PROFILE OF A LOGIC CIRCUIT, AND ASSOCIATED DEVICE

(71) Applicant: STMicroelectronics (Rousset) SAS, Rousset (FR)

(72) Inventors: Alexandre Sarafianos, Pourrieres (FR); Thomas Ordas, Pourcieux (FR); Yanis Linge, Fuveau (FR)

(73) Assignee: STMicroelectronics (Rousset) SAS, Rousset (FR)

(*) Notice: Subject to any disclaimer, the term of this patent is extended or adjusted under 35 U.S.C. 154(b) by 305 days.

(21) Appl. No.: 16/186,820

(22) Filed: Nov. 12, 2018

(65) Prior Publication Data

US 2019/0147771 A1 May 16, 2019

(30) Foreign Application Priority Data

Nov. 13, 2017 (FR) ..................................... 1760637

(51) Int. Cl.
*G09C 1/00* (2006.01)
*H03K 19/003* (2006.01)
*H04L 9/00* (2006.01)
*G06F 21/75* (2013.01)

(52) U.S. Cl.
CPC .............. *G09C 1/00* (2013.01); *G06F 21/75* (2013.01); *G06F 21/755* (2017.08); *H03K 19/00315* (2013.01); *H04L 9/003* (2013.01); *H04L 2209/08* (2013.01); *H04L 2209/12* (2013.01)

(58) Field of Classification Search
CPC ......... G06F 21/755; G06F 21/75; G09C 1/00; H03K 19/00315; H04L 9/003

USPC ........................................................... 380/28
See application file for complete search history.

(56) References Cited

U.S. PATENT DOCUMENTS

| | | | |
|---|---|---|---|
| 6,419,159 B1* | 7/2002 | Odinak | ................ G06K 19/073 235/492 |
| 6,625,737 B1 | 9/2003 | Kissell | |
| 6,848,619 B1 | 2/2005 | Leydier | |
| 8,289,052 B2 | 10/2012 | Kawae | |
| 8,922,241 B2 | 12/2014 | Urakawa | |
| 9,342,685 B2 | 5/2016 | Janke et al. | |
| 2002/0067201 A1 | 6/2002 | Butler | |

(Continued)

FOREIGN PATENT DOCUMENTS

FR 2796738 A1 1/2001

*Primary Examiner* — Jacob Lipman
(74) *Attorney, Agent, or Firm* — Slater Matsil, LLP (57) ABSTRACT

In an embodiment, a circuit includes a supply terminal, a reference terminal, a logic circuit coupled between the supply terminal and the reference terminal, and an auxiliary circuit coupled to the logic circuit. The auxiliary circuit includes a plurality of switches configured to be controlled to produce random criterions. Each random criterion causes, on each transition of an output signal of the logic, an attenuation of a current flowing between a supply terminal of the circuit and a reference terminal of the circuit; or an increase of the current flowing between the supply terminal of the circuit and the reference terminal of the circuit; or an additional current flowing through the logic circuit on a current path not passing through the supply terminal; or no change in the current flowing between the supply terminal of the circuit and the reference terminal of the circuit.

26 Claims, 4 Drawing Sheets

(56) References Cited

U.S. PATENT DOCUMENTS

2004/0064715 A1\* 4/2004 Kaminaga ........... G06F 9/30043
                                                    713/193
2015/0169904 A1    6/2015 Leiserson et al.
2017/0195114 A1\* 7/2017 Martin ................... H04L 9/003

\* cited by examiner

METHOD FOR RANDOMLY MODIFYING THE CONSUMPTION PROFILE OF A LOGIC CIRCUIT, AND ASSOCIATED DEVICE

CROSS-REFERENCE TO RELATED APPLICATIONS

This application claims the benefit of French Patent Application No. 1760637, filed on Nov. 13, 2017, which application is hereby incorporated herein by reference.

TECHNICAL FIELD

The present invention relates generally to electronic circuits, and, in particular embodiments, to a method for randomly modifying the consumption profile of a logic circuit, and associated device.

BACKGROUND

Figure 1:
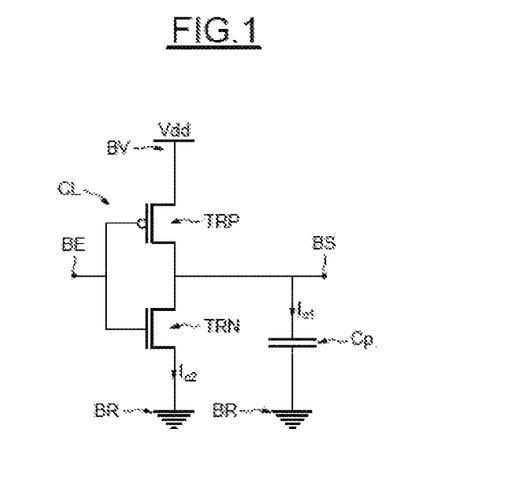
FIG. 1, described above, illustrates the prior art.

FIG. 1 illustrates a logic circuit CL of inverter type connected between a supply terminal BV, which is intended to receive a supply voltage Vdd, and a reference terminal BR, which is intended to receive a reference voltage, here for example ground. The logic circuit CL conventionally comprises an input terminal BE and an output terminal BS.

The output terminal BS may here be connected to the input of another component of an integrated circuit CI (not shown), for example to another inverter. This connection may generate parasitic capacitances, due, for example, to the gate capacitances of the transistors of the other inverter.

In FIG. 1, this parasitic capacitance is represented by a parasitic capacitor Cp.

The logic circuit CL conventionally includes an NMOS transistor TRN connected in series with a PMOS transistor TRP between the supply terminal BV and the reference terminal BR. The input terminal BE of the logic circuit is coupled to the gates of the two transistors, and the output terminal BS is coupled to the node common to the two transistors, here the node common to the drain of the PMOS transistor TRP and to the drain of the NMOS transistor TRN.

Thus, during the transition of the signal present on the input terminal BE from a high state to a low state, the PMOS transistor TRP turns on and the NMOS transistor TRN turns off. The capacitor Cp then charges by virtue of the current $I_{c1}$ flowing through the PMOS transistor TRP. Since the charging time of the capacitor is very short, this current may be likened to a charging current peak $I_{c1}$.

In addition, switching the two transistors simultaneously creates, for a very short period of time, a short circuit between the supply terminal BV and the reference terminal BR. The length of this period of time decreases with switching time. Thus, on each switch, a short-circuit current peak $I_{c2}$ flows between the supply terminal BV and the reference terminal BR through the two transistors TRP and TRN.

The current peak generated during a transition of the signal delivered by the output terminal BS from a low state to a high state may have a different value from that of the current peak generated during a transition from a high state to a low state.

During a transition of the signal present on the output terminal BS from a low state to a high state, the logic circuit CL consumes a larger current than it consumes during a transition from a high state to a low state, since in the first case the current consumed is the sum of the charging current $I_{c1}$ of the parasitic capacitor Cp and of the short-circuit current $I_{c2}$, and in the second case the current consumed corresponds only to the short-circuit current $I_{c2}$.

Thus, by analyzing the current consumption of an integrated circuit including logic gates, using for example an electromagnetic probe placed level with the supply terminal and dedicated algorithms, it is possible to obtain information on the operations performed and on the data manipulated and/or on their occurrences.

Furthermore, during a transition of the signal present on the output terminal BS from a high state to a low state, the discharge of the parasitic capacitor Cp generates an additional current that flows through the interior of the integrated circuit.

It should be noted that this additional current is not observable from the supply terminal BV, but may however be detected for example by analyzing the overall electromagnetic emissions of the integrated circuit.

It is therefore advantageous to mask as much as possible the current consumption of the integrated circuit.

Solutions for masking the current consumption of an integrated circuit do exist, such as for example the dual-rail technique, which smooths the current consumption of an integrated circuit by generating a current that is complementary to the actual current consumption of the logic circuits of the circuit.

This being so, this solution is constraining since it implies also masking the current consumption of logic gates the consumption of which it is not necessary to mask. Moreover, this technique is costly in terms of real estate, since it requires the number of logic gates of the integrated circuit to be doubled.

Solutions allowing the current consumption of a logic circuit to be masked without masking the current consumption of other components do exist, but the existing solutions are complex and require many components to be used.

SUMMARY

One or more embodiments relate to integrated circuits, and especially, but not exclusively, to integrated circuits including logic circuits.

One or more embodiments relate to the management of the current consumption of, for example, integrated circuits during operation. In particular, some embodiments relate to masking the current consumption of integrated circuits.

According to one embodiment, it is proposed to mask the current consumption of a logic circuit incorporated within an integrated circuit using simple circuits and methods that allow the masking of current consumption to be focused on the logic circuit.

According to one aspect, an electronic circuit includes a supply terminal and a reference terminal comprising at least one module including at least one logic circuit connected between the supply terminal and the reference terminal and including an output terminal, and at least one auxiliary circuit connected between the supply terminal and the reference terminal, and connected to the output terminal, the at least one auxiliary circuit being configured to carry out at least one action chosen from the group formed by:
  attenuating the current flowing between the supply terminal and the reference terminal;
  increasing the current flowing between the supply terminal and the reference terminal;
  making an additional current flow, through the logic circuit, on a path not passing through the supply terminal; or to carry out no action, the choice as to whether or not to carry out an action and the possible choice of the at least one action from the group being made depending on a random criterion.

Thus, the auxiliary circuit advantageously allows consumption profiles to be created, which allows, for a given performed logic operation, the current consumption of the integrated circuit to be modified, and therefore the actual current consumption of the logic circuit to be masked, making it difficult, for an attacker, to analyze this consumption with the aim of studying the behavior of the integrated circuit.

The random criterion may be modified (e.g., synchronously) at the tempo of the transitions of the signal on the output terminal or modified independently of the tempo of occurrence of the transitions of the signal on the output terminal.

According to one embodiment, the auxiliary circuit includes at least one first capacitor connected between the supply terminal and the output terminal, and at least one capacitor connected between the output terminal and the reference terminal, the at least one first capacitor being connected to the supply terminal via a first switch, the second capacitor being connected to the reference terminal via a second switch, and the two capacitors being connected to the output terminal via a third switch, the three switches being controlled independently of one another by a random-signal generator, the random signals together forming the random criterion.

Thus, each random criterion corresponds to one combination of the switches and, therefore, to one current-consumption profile.

The use of capacitors that are activatable via the switches advantageously allows an auxiliary circuit that effectively masks current consumption to be obtained using circuits that are simple and easy to produce with conventional fabrication processes.

The auxiliary circuit may include a plurality of first capacitors connected in parallel between the supply terminal and the output terminal, each first capacitor being coupled to the output terminal via a separate switch controlled independently by the random-signal generator.

The auxiliary circuit may include a plurality of second capacitors connected in parallel between the supply terminal and the output terminal, each second capacitor being connected to the output terminal via a separate switch controlled independently by the random-signal generator.

By increasing the number of activatable capacitors, the number of possible consumption profiles of the auxiliary circuit is increased, and therefore advantageously the random nature of the current consumption.

The module may be configured to carry out a succession of computational operations, the random-signal generator being configured to deliver the random signals in response to a control signal, and the auxiliary circuit includes a control circuit suitable for modifying the control signal on each new computational operation.

This allows the current consumption profile to be modified regularly, without modifying the consumption profile too often. In some embodiments, modifying the current consumption too often may be costly in terms of computational power.

The module may be configured to carry out computational operations, the random-signal generator being configured to deliver the random signals in response to a control signal, and the auxiliary circuit may include a control circuit suitable for modifying the control signal at a tempo independent of the computational operations.

It is thus possible to make the change of consumption profile independent of the tempo of the operations carried out by the module, and, for example, to increase the frequency of the profile changes, thereby advantageously increasing the random nature of the current consumption.

According to one embodiment, the module includes a plurality of logic circuits, each associated with one auxiliary circuit, the switches of each auxiliary circuit being controlled in the same way by the random-signal generator.

According to one embodiment, the module includes a plurality of logic circuits, each associated with an accelerator circuit, the switches of each auxiliary circuit being controlled independently by the random-signal generator.

According to one aspect, a system comprising an integrated circuit such as described above is provided, the system possibly forming a chip card (e.g., a smart card) or a piece of information-technology apparatus.

According to another aspect, there is provided a method for managing the current consumption of a logic circuit supplied with power between a supply terminal and a reference terminal and including at least one output terminal, where, on each transition of the signal on the output terminal, at least one action is carried out, this action being chosen from the group formed by:
  attenuating the current flowing between the supply terminal and the reference terminal;
  increasing the current flowing between the supply terminal and the reference terminal; or
  making an additional current flow, through the logic circuit, on a path not passing through the supply terminal; or
  no action is carried out, the choice as to whether or not to carry out an action and the possible choice of the at least one action from the group being made depending on a random criterion.

The random criterion may be modified at the tempo of the transitions of the signal on the output terminal, or be modified at a tempo independent of the tempo of occurrence of the transitions of the signal on the output terminal.

BRIEF DESCRIPTION OF THE DRAWINGS

Other advantages and features of the invention will become apparent on examining the detailed description of completely non-limiting implementations and embodiments of the invention, and the appended drawings, in which.

DETAILED DESCRIPTION OF ILLUSTRATIVE EMBODIMENTS

Figure 2:
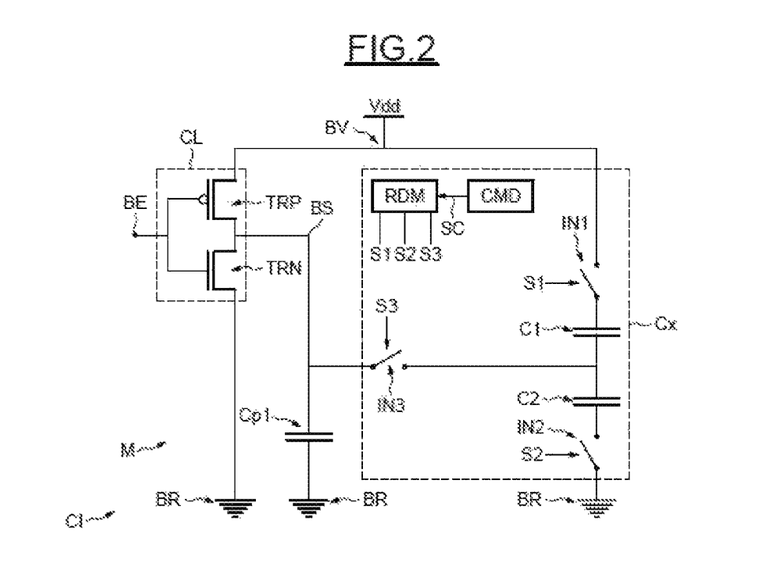
FIGS. 2 to 9 illustrate implementations and embodiments of the invention.

FIG. 2 schematically illustrates from an electrical point of view an integrated circuit CI incorporating a module M containing a logic circuit CL including an input terminal BE and an output terminal BS, and connected to an auxiliary circuit Cx.

The logic circuit CL and the auxiliary circuit Cx are both connected between a supply terminal BV that is configured to receive a supply voltage Vdd, for example delivered by a supply module (not shown), and a reference terminal BR that is configured to receive a reference voltage, here ground.

The logic circuit CL includes a PMOS transistor TRP and an NMOS transistor TRN that are mounted in series between the supply terminal BV and the reference terminal BR. Other logic circuits may be used.

The inverter includes the input terminal BE, which is connected to the gate of the PMOS transistor TRP and to the gate of the NMOS transistor TRN, and the output terminal BS, which is connected between the NMOS transistor TRN and the PMOS transistor TRP, and to another logic circuit, the connection of which generates a first parasitic capacitance Cp1.

The output terminal BS may be connected to the input of another component of the integrated circuit CI (not shown), for example to another inverter. This connection may generate parasitic capacitances due in particular to the gate capacitance of the other inverter.

In FIG. 2, these parasitic capacitances are represented by a first parasitic capacitor Cp1.

It should be noted that although, for the sake of simplicity, a logic circuit forming an inverter has been described in FIG. 2, the logic circuit CL could be any type of logic circuit, or any assembly of logic circuits the output terminal BS of which is suitable for delivering an output signal able to take at least two states, a low state corresponding to connection of the output terminal BS to the reference terminal BR, and a high state corresponding to connection of the output terminal BS to the supply terminal BV.

The auxiliary circuit comprises a first capacitor C1, which is connected between the supply terminal BV and the output terminal BS, and a second capacitor C2 that is connected between the output terminal S and the reference terminal BR. The first capacitor C1 and the second capacitor C2 have different capacitances. In some embodiments, C1 and C2 have identical capacitances.

The first capacitor C1 is connected to the supply terminal via a first switch IN1, the second capacitor C2 is connected to the reference terminal BR via a second switch IN2, and the two capacitors C1 and C2 are connected to the output terminal BS via a third switch IN3.

In some embodiments, the switches are for example MOS transistors, the on state of which corresponds to the closed position of the switch and the off state of which corresponds to the open state of the switch.

The auxiliary circuit Cx includes a random-signal generator RDM, here including 3 outputs that are configured to deliver a first signal S1, a second signal S2, and a third signal S3, allowing the first switch S1, the second switch S2, and the third switch S3 to be controlled, respectively.

The three signals S1, S2 and S3 may take two states, which correspond to a command to open and to close the switches.

The signals S1, S2 and S3 are delivered in a random state by the random-signal generator RDM, in response to a control signal SC delivered to the generator RDM by control means CMD.

Each combination of these states of the random signals forms a random criterion.

In operation, when the module M carries out a succession of computational operations, for example a cryptographic operation, the control circuit CMD transmits the control signal SC on each new computational operation.

Thus, the generator RDM delivers a random criterion, i.e., the three signals in random states, and maintains this random criterion unchanged throughout the duration of each cryptographic operation.

During a cryptographic operation, the output of the logic circuit CL may change state a plurality of times.

The auxiliary circuit has eight configurations corresponding to eight possible combinations of switches, and therefore to 8 random criteria.

Each configuration corresponds to one current consumption profile of the module M, i.e., for a given operation carried out by the logic circuit CL, the current consumption may differ from one configuration to another.

In the first configuration, the second configuration, and the third configuration, the third switch IN3 is open, and at least one of the two other switches IN1 and IN2 is open.

In these three first configurations, the auxiliary circuit Cx has no effect on the current consumption of the logic gate. The integrated circuit CI therefore operates as though the auxiliary circuit were absent.

In a fourth configuration, the third switch IN3 is open, and the first switch IN1 and the second switch IN2 are closed.

In this fourth configuration, the first capacitor C1 and the second capacitor C2 are connected in series between the supply terminal BV and the reference terminal BR. They therefore behave as decoupling capacitors.

Thus, during a transition of the state of the signal on the output terminal BS of the logic circuit CL, the short-circuit current peak and possibly the charging current peak of the first parasitic capacitor Cp1 are not due solely to the supply module connected to the supply terminal BV, but in part due to the capacitors C1 and C2.

The fourth configuration therefore allows the current consumption observed at the supply terminal BV to be attenuated.

In a fifth configuration, the third switch IN3 is closed, and the first switch IN1 and the second switch IN2 are open.

In this fifth configuration, the first capacitor C1 and the second capacitor C2 both have a floating electrode, and therefore have no effect on the operation of the auxiliary circuit Cx.

This being so, the connection between the output terminal and the two transistors, which includes a metal track, and the closed third switch IN3, which conventionally includes a transistor in the on state, generates parasitic capacitances.

Figure 3:
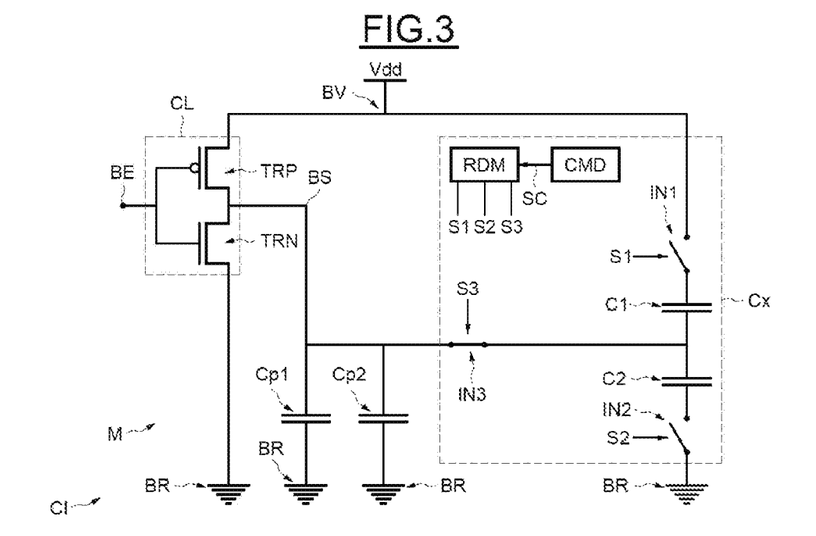

These parasitic capacitances may be symbolized by a second parasitic capacitor Cp1 connected between the output terminal and the reference terminal, as illustrated in FIG. 3.

Thus, during a transition of the signal on the output terminal BS from a high state to a low state, a second charging current that acts to charge the second parasitic capacitor Cp2 is generated.

During a transition of the signal on the input terminal BE from a low state to a high state, the discharge of the second parasitic capacitor Cp2 through the NMOS transistor TRN generates an additional current that flows through the interior of the integrated circuit.

It should be noted that this current is not observable from the supply terminal BV, but may be detected by an attack employing analysis of the electromagnetic emissions of the module M in operation.

The fifth configuration therefore allows the current consumption observed from the supply terminal to be increased in the case of a transition of the logic gate from a high state to a low state, and the current flowing through the interior of the module to be increased in the case of a transition from a high state to a low state.

The second parasitic capacitor Cp2 is present in all the configurations in which the third switch IN3 is closed, i.e., the fifth configuration, which was studied above, and the sixth, seventh and eighth configurations, which are described below. In some embodiments, the second parasitic capacitor Cp2 is in general negligible with a view to the effects produced by the first capacitor C1 and the second capacitor C2.

In a sixth configuration, the third switch IN3 is closed, the first switch IN1 is open, and the second switch IN2 is closed.

In this sixth configuration, the second capacitor C2 behaves in the same way as the first parasitic capacitor Cp1.

Thus, during a change of state of the signal on the output terminal BS from a low state to a high state, the output terminal BS is connected to the supply terminal BV, and the second capacitor C2 charges, here through the PMOS transistor TRP. An additional charging current is therefore generated.

During a change of state of the signal on the output terminal from a high state to a low state, the second capacitor C2 discharges to ground, here through the NMOS transistor TRN, and generates a discharge current that is internal to the integrated circuit and that therefore is not observable from the supply terminal.

Since the second capacitor C2 is not here an actual parasitic capacitor, it's capacitance, and therefore the currents that it generates, are larger than for the first parasitic capacitor Cp1 and for the second parasitic capacitor Cp2.

The sixth configuration therefore allows, in addition to producing the effects of the fifth configuration described above, the current consumed by the integrated circuit to be increased during a transition of the signal on the output terminal from a low state to a high state, and an internal current to be generated during a transition of the signal on the output terminal from a high state to a low state.

In a seventh configuration, the first switch IN1 and the third switch IN3 are closed, and the second switch IN2 is open.

In this seventh configuration, the first capacitor C1 is connected between the supply terminal BV and the output terminal BS, and the second capacitor C2 is disconnected.

During a transition of the signal on the output terminal BS from a low state to a high state, the first capacitor C1 has its two electrodes connected to the supply terminal By. In this case, the first capacitor C1 has no effect on the current consumption of the integrated circuit CI, and only the effects of the second parasitic capacitor Cp2, which were described above, are produced.

During a transition of the signal on the output terminal BS from a high state to a low state, the first capacitor C1 discharges to ground through the MOS transistor TRN.

A current therefore flows within the integrated circuit CI, internally and therefore in a way that is not observable from the supply terminal BV. To this current is added the current produced by the discharge of the second parasitic capacitor Cp1.

In the eighth configuration, switches IN1, IN2, and IN3 are closed.

The auxiliary circuit Cx therefore produces, in this case, in combination, the effects of the fourth configuration to the seventh configuration.

Thus, since the signals S1, S2, S3 are delivered randomly, the auxiliary circuit Cx is randomly in one or other of its configurations.

The current consumption observable on each change of state of the signal on the output terminal BS of the logic circuit CL varies randomly.

The passage from one randomly chosen configuration to another, i.e., the generation of a new criterion randomly in response to the control signal SC, may occur on each new operation carried out by the module M, or may occur regularly at a tempo defined by a clock signal, independently of the operations carried out by the module M. In some embodiments, the passage from one randomly chosen configuration to another may occur randomly.

Figure 4:
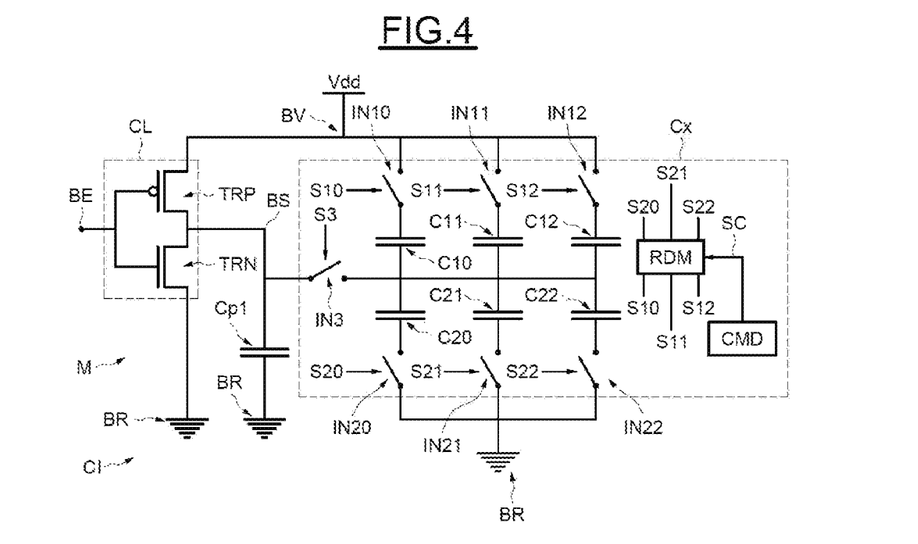

In order to further improve the random behavior of the current consumption of the module M, it is possible, as illustrated in FIG. 4, for the auxiliary circuit Cx to include a plurality of first capacitors and a plurality of second capacitors. In some embodiments, each of the plurality of first and second capacitors have identical capacitances. In other embodiments, some or all of the plurality of first and second capacitors have different capacitances.

As shown in FIG. 4, the auxiliary circuit Cx includes three first capacitors C10, C11, and C12, that are connected in parallel between the supply terminal BV and the output terminal BS, and that are coupled to the supply terminal BV via three first switches IN10, IN11, IN12.

The auxiliary circuit Cx includes three second capacitors C20, C21, and C22 that are connected in parallel between the output terminal BS and the reference terminal BR, and that are coupled to the reference terminal BR via three second switches IN20, IN21, IN22.

Each of the capacitors has a different capacitance, but it is entirely possible for the capacitors to all have the same capacitance, or only certain thereof to have the same capacitance.

The switches IN10, IN11, IN12, IN20, IN21, IN22, and IN3 are configured to be controllable independently from one another by the random-signal generator RDM.

The random-signal generator RDM therefore includes seven outputs that are configured to deliver seven signals S10, S11, S12, S20, S21, S22, S3, to the switches IN10, IN11, IN12, IN20, IN21, IN22 and IN3, respectively.

The seven signals are available to randomly take two states corresponding to a closed state and to an open state of the associated switch.

Thus, the auxiliary circuit Cx allows one hundred and twenty-eight switch combinations to be achieved, i.e., one hundred and twenty-eight consumption profiles, thus further improving the random nature of the consumption of the module M.

Figure 5:
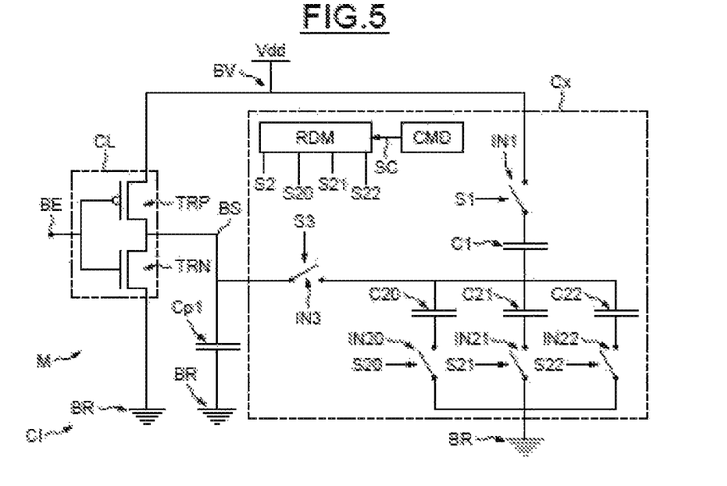
Figure 6:
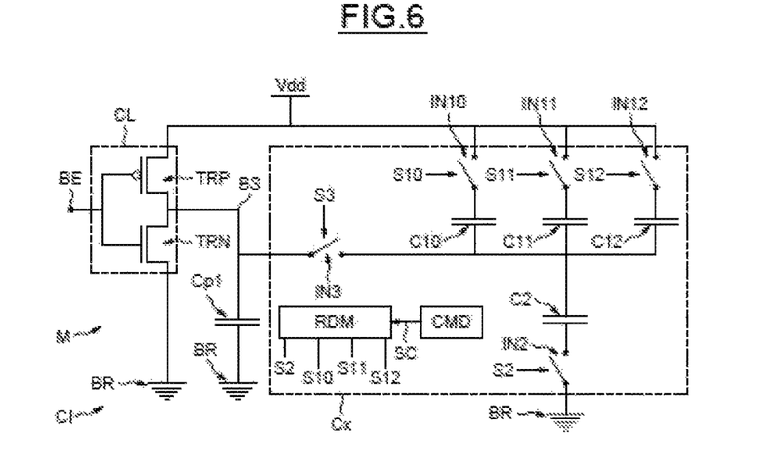

It is also possible, as illustrated in FIGS. 5 and 6, for the auxiliary circuit Cx to comprise a different number of first capacitors and second capacitors.

Thus, in FIG. 5, the auxiliary circuit Cx includes a single first capacitor C1 and three second capacitors C20, C21, C22.

In FIG. 6, the auxiliary circuit Cx includes a single second capacitor C2 and three first capacitors C10, C11, C12.

This advantageously allows the design of the integrated circuit, and in particular of the generator RDM of the random signals, to be simplified since the number of outputs required for the auxiliary circuit Cx to operate is restricted.

Figure 7:
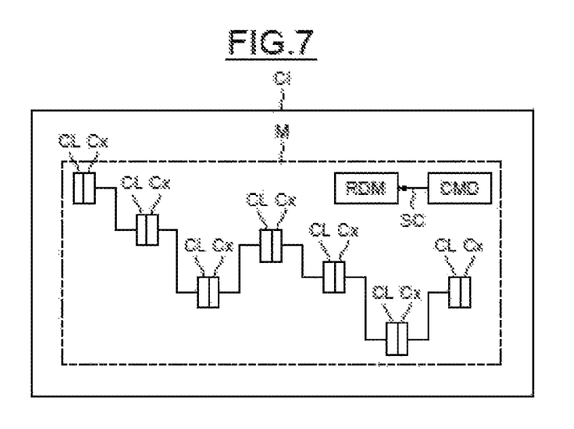

FIG. 7 illustrates a top view of an integrated circuit CI including a module M configured to carry out cryptographic operations.

The module M here includes a plurality of logic circuits CL that are coupled in series, each logic circuit CL being associated with an auxiliary circuit according to any one of the embodiments described above with reference to FIGS. 2 to 6.

As shown in FIG. 7, each of the logic circuits CL (which may be identical or different from each other) is associated with an auxiliary circuit, where each auxiliary circuit is identical to each other. Each auxiliary circuit is controlled, in the same way, by the same random-signal generator RDM. All the auxiliary circuits of the module M therefore depend on the same random criterion, and are therefore in the same configuration.

It would however be possible for the logic circuits CL to be associated with different auxiliary circuits and/or to be controlled independently of one another dependent on different random criterion, for example a given random-signal generator RDM delivering a plurality of different random criteria, or each criterion being delivered by a separate random-signal generator.

Figure 8:
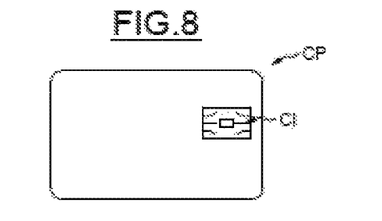
Figure 9:
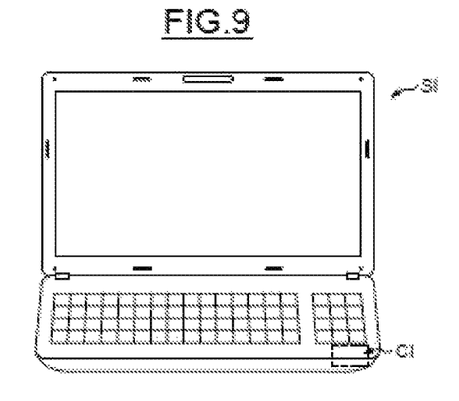

The integrated circuit CI may be integrated into any type of electronic system, for example a chip card CP, as illustrated in FIG. 8, or a piece of information-technology apparatus, as illustrated in FIG. 9, which shows a laptop SI.

What is claimed is:

1. A method for managing a current consumption of a circuit that comprises a logic circuit comprising a high-side transistor and a low-side transistor, and an auxiliary circuit, the method comprising:
   producing an output signal on an output terminal of the logic circuit;
   generating a random value; and
   controlling switches of the auxiliary circuit based on the random value to select a random criterion of a plurality of random criterions, wherein the plurality of random criterions comprises:
      a first random criterion that causes, on each transition of the output signal, an attenuation, with respect to the auxiliary circuit causing no change, of a current flowing between a supply terminal of the circuit and a reference terminal of the circuit,
      a second random criterion that causes, on each transition of the output signal, an increase, with respect to the auxiliary circuit causing no change, of the current flowing between the supply terminal of the circuit and the reference terminal of the circuit, and
      a third random criterion that causes, on each transition of the output signal, an additional current, with respect to the auxiliary circuit causing no change, flowing through the logic circuit on a current path not passing through the supply terminal or the high-side transistor of the logic circuit.

2. The method of claim 1, wherein generating the random value comprises generating a random signal with a random-signal generator, and wherein controlling the switches of the auxiliary circuit is based on the random signal.

3. The method of claim 1, further comprising receiving an input signal with an input of the logic circuit, wherein producing the output signal comprises producing the output signal based on the input signal.

4. The method of claim 1, further comprising modifying the random criterion synchronously with transitions of the output signal.

5. The method of claim 1, further comprising modifying the random criterion independently from transitions of the output signal.

6. The method of claim 1, wherein increasing the current flowing between the supply terminal of the circuit and the reference terminal of the circuit is caused by connecting, using the switches of the auxiliary circuit, one or more capacitors between the supply terminal of the circuit and the reference terminal of the circuit.

7. The method of claim 1, wherein the switches of the auxiliary circuit comprises:
   a first switch coupled between the supply terminal of the circuit and a first terminal of a first capacitor;
   a second switch coupled between a first terminal of a second capacitor and the reference terminal of the circuit; and
   a third switch coupled between the output terminal of the logic circuit and second terminals of the first and second capacitors.

8. The method of claim 1, wherein the plurality of random criterions further comprises a fourth random criterion that causes, on each transition of the output signal, no change in the current flowing between the supply terminal of the circuit and the reference terminal of the circuit.

9. A circuit comprising:
   a supply terminal;
   a reference terminal;
   a logic circuit comprising a high-side transistor and a low-side transistor and coupled between the supply terminal and the reference terminal, the logic circuit configured to produce an output signal on an output terminal of the logic circuit; and
   an auxiliary circuit coupled between the supply terminal and the reference terminal, the auxiliary circuit further coupled to the output terminal of the logic circuit, the auxiliary circuit comprising a plurality of switches, wherein the auxiliary circuit is configured to control the plurality of switches to produce a random criterion of a plurality of random criterions based on a random value, wherein the plurality of random criterions comprises:
      a first random criterion that causes, on each transition of the output signal, an attenuation, with respect to the auxiliary circuit causing no change, of a current flowing between the supply terminal and the reference terminal,
      a second random criterion that causes, on each transition of the output signal, an increase, with respect to the auxiliary circuit causing no change, of the current flowing between the supply terminal and the reference terminal,
      a third random criterion that causes, on each transition of the output signal, an additional current, with respect to the auxiliary circuit causing no change, flowing through the logic circuit on a current path not passing through the supply terminal or the high-side transistor of the logic circuit, and
      a fourth random criterion that causes no change in the current flowing between the supply terminal and the reference terminal.

10. The circuit of claim 9, wherein the circuit is part of a chip card.

11. The circuit of claim 9, further comprising a plurality of logic circuits, wherein each logic circuit of the plurality of logic circuits is coupled with a respective auxiliary circuit of a plurality of auxiliary circuits, and wherein switches of each auxiliary circuit are controlled by random signals generated by a random-signal generator.

12. The circuit of claim 11, wherein each switch of the switches of each auxiliary circuit of the plurality of auxiliary circuits is controlled independently by the random-signal generator.

13. The circuit of claim 9, wherein the auxiliary circuit further comprises a random-signal generator configured to produce the random value.

14. The circuit of claim 9, wherein the random criterion is modified synchronously with transitions of the output signal.

15. The circuit of claim 9, wherein the random criterion is modified independently from transitions of the output signal.

16. The circuit of claim 9, wherein the logic circuit comprises an inverter.

17. The circuit of claim 9, wherein the logic circuit comprises metal-oxide-semiconductor (MOS) transistors.

18. The circuit of claim 9, wherein the plurality of switches comprises:
   a first switch coupled to the supply terminal;
   a second switch coupled to the reference terminal; and
   a third switch coupled to the output terminal of the logic circuit, wherein the auxiliary circuit further comprises:
   a first capacitor coupled between the third switch and the first switch; and
   a second capacitor coupled between the third switch and the second switch.

19. The circuit of claim 18, wherein the first, second, and third switches are controlled independently of one another using random signals produced by a random-signal generator, the random signals together forming the random criterion.

20. The circuit of claim 19, wherein the auxiliary circuit comprises a plurality of capacitors coupled between the third switch and the supply terminal using respective switches, and wherein the respective switches are controlled with the random signals.

21. The circuit of claim 19, wherein the auxiliary circuit comprises a plurality of capacitors coupled between the third switch and the reference terminal using respective switches, and wherein the respective switches are controlled with the random signals.

22. The circuit of claim 19, wherein the circuit is configured to carry out a succession of computational operations, wherein the random-signal generator is configured to deliver the random signals in response to a control signal, and wherein the auxiliary circuit comprises a control circuit configured to modify the control signal on each new computational operation.

23. The circuit of claim 19, wherein the circuit is configured to carry out a succession of computational operations, wherein the random-signal generator is configured to deliver the random signals in response to a control signal, and wherein the auxiliary circuit comprises a control circuit configured to modify the control signal independently from the computational operations.

24. A circuit comprising:
   a supply terminal;
   a reference terminal;
   a logic circuit coupled between the supply terminal and the reference terminal, the logic circuit having an output terminal and configured to produce an output signal at the output terminal; and
   an auxiliary circuit comprising:
      a first switch coupled to the supply terminal;
      a second switch coupled to the reference terminal;
      a third switch coupled to the output terminal of the logic circuit,
      a first capacitor coupled between the third switch and the first switch;
      a second capacitor coupled between the third switch and the second switch; and
      a random-signal generator coupled to the first, second, and third switches and configured to control the first, second, and third switches by generating random signals, wherein:
         a first combination of random signals is configured to cause, on each transition of the output signal, an attenuation, with respect to the auxiliary circuit causing no change, of a current flowing between the supply terminal and the reference terminal,
         a second combination of random signals is configured to cause, on each transition of the output signal, an increase, with respect to the auxiliary circuit causing no change, of a current flowing between the supply terminal and the reference terminal, and
         a third combination of random signals is configured to cause, on each transition of the output signal, an additional current, with respect to the auxiliary circuit causing no change, flowing through the logic circuit on a current path not passing through the supply terminal or a high-side transistor of the logic circuit.

25. The circuit of claim 24, wherein, in the first combination of random signals, the first and second switches are closed and the third switch is open so as to cause an attenuation, with respect to the auxiliary circuit causing no change, of the current flowing between the supply terminal and the reference terminal.

26. The circuit of claim 24, wherein, in the third combination of random signals, the third switch is closed and at least one of the first and second switches is open so as to cause the additional current, with respect to the auxiliary circuit causing no change, flowing through the logic circuit on a current path not passing through the supply terminal or the high-side transistor of the logic circuit.

* * * * *